(12) United States Patent
Sun et al.

(10) Patent No.: US 10,285,169 B2
(45) Date of Patent: May 7, 2019

(54) DOWNLINK CONTROL INFORMATION (DCI) ENHANCEMENTS FOR NON-ORTHOGONAL MULTIPLE ACCESS

(71) Applicant: QUALCOMM Incorporated, San Diego, CA (US)

(72) Inventors: Jing Sun, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 15/192,662

(22) Filed: Jun. 24, 2016

(65) Prior Publication Data

US 2017/0013599 A1 Jan. 12, 2017

Related U.S. Application Data

(60) Provisional application No. 62/204,922, filed on Aug. 13, 2015, provisional application No. 62/191,230, filed on Jul. 10, 2015.

(51) Int. Cl.
*H04L 5/00* (2006.01)
*H04W 72/04* (2009.01)
*H04B 7/0456* (2017.01)

(52) U.S. Cl.
CPC ........ *H04W 72/042* (2013.01); *H04B 7/0456* (2013.01); *H04L 5/0053* (2013.01); *H04L 5/0023* (2013.01)

(58) Field of Classification Search
CPC .......................... H04W 72/042; H04W 7/0456
USPC .................................. 370/252–339; 455/436
See application file for complete search history.

(56) References Cited

U.S. PATENT DOCUMENTS

| | | |
|---|---|---|
| 2011/0103498 A1 | 5/2011 | Chen et al. |
| 2013/0039284 A1* | 2/2013 | Marinier ............... H04L 5/001 370/329 |
| 2014/0038619 A1* | 2/2014 | Moulsley ............ H04B 7/024 455/446 |
| 2014/0086160 A1 | 3/2014 | Kim et al. |
| 2015/0358064 A1 | 12/2015 | Benjebbour et al. |
| 2016/0309542 A1* | 10/2016 | Kowalski ............. H04W 76/27 |

FOREIGN PATENT DOCUMENTS

WO 2014104114 A1 7/2014

OTHER PUBLICATIONS

International Search Report and Written Opinion—PCT/US2016/039607—ISA/EPO—dated Sep. 21, 2016.

\* cited by examiner

*Primary Examiner* — Iqbal Zaidi
(74) *Attorney, Agent, or Firm* — Arent Fox LLP

(57) ABSTRACT

The present disclosure relates to downlink control information (DCI) enhancements for non-orthogonal multiple access. For example, the disclosure presents a method and an apparatus for wireless communications that may include determining, at the base station, downlink control information (DCI) for a first user equipment (UE), wherein the DCI for the first UE comprises modulation order information, spatial layer information, and power ratio information of the first UE, and a precoding matrix indicator (PMI) and spatial layer information of a second UE; and transmitting the determined DCI to the first UE.

35 Claims, 10 Drawing Sheets

DOWNLINK CONTROL INFORMATION (DCI) ENHANCEMENTS FOR NON-ORTHOGONAL MULTIPLE ACCESS

CROSS-REFERENCE TO RELATED APPLICATIONS

The present application for patent claims priority to U.S. Provisional Patent Application Nos. 62/204,922, filed Aug. 1, 2015, entitled "Downlink Control Information (DCI) Enhancements for Non-orthogonal Multiple Access" and 62/191,230, filed Jul. 10, 2015, entitled "Downlink Control Information (DCI) Enhancements for Non-orthogonal Multiple Access," which are assigned to the assignee hereof, and hereby expressly incorporated by reference in its entirety herein.

FIELD OF THE DISCLOSURE

The present disclosure relates generally to communication systems, and more particularly, non-orthogonal multiple access (NOMA) systems.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies. However, in NOMA systems, a base layer (BL) associated with a BL user equipment (UE) and an enhancement layer (EL) associated with an EL UE are limited to using the same precoding matrix.

Therefore, it may be desirable to implement download control information (DCI) enhancements to provide more flexibility.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents an example method and apparatus for wireless communications. For example, the present disclosure presents an example method for wireless communications at a base station that may include determining, at the base station, downlink control information (DCI) for a first user equipment (UE), wherein the DCI for the first UE comprises modulation order information, spatial layer information, and power ratio information of the first UE, and a precoding matrix indicator (PMI) and spatial layer information of a second UE; and transmitting the determined DCI to the first UE.

The present disclosure further includes wherein the first UE is a base layer (BL) UE and the second UE is an enhancement layer (EL) UE; wherein the first UE is a pre-Release 14 UE and the second UE is a Release 14 or later UE; or wherein the first UE and the second UE are Release 14 or later UEs.

The present disclosure further includes wherein the power ratio information is transmitted to the first UE and the second UE via radio resource control (RRC) signaling.

The present disclosure further includes wherein the power ratio information is a traffic to pilot ratio (TPR).

The present disclosure further includes wherein the TPR indicates a ratio of a total BL data resource element (RE) power over a reference signal power to the first UE.

The present disclosure further includes wherein the power ratio information includes a power ratio between an EL only spatial layer and a BL spatial layer.

Additionally, the present disclosure presents an example apparatus for wireless communications at a base station that may include means for determining, at the base station, downlink control information (DCI) for a first user equipment (UE), wherein the DCI for the first UE comprises modulation order information, spatial layer information, and power ratio information of the first UE, and a precoding matrix indicator (PMI) and spatial layer information of a second UE; and means for transmitting the determined DCI to the first UE.

The present disclosure further includes wherein the first UE is a base layer (BL) UE and the second UE is an enhancement layer (EL) UE and wherein the first UE is a pre-Release 14 UE and the second UE is a Release 14 or later UE.

The present disclosure further includes wherein the power ratio information is transmitted to the first UE and the second UE via radio resource control (RRC) signaling.

The present disclosure further includes wherein the power ratio information is a traffic to pilot ratio (TPR).

The present disclosure further includes wherein the TPR indicates a ratio of a total BL data resource element (RE) power over a reference signal power to the first UE.

The present disclosure further includes wherein the power ratio information includes a power ratio between an EL only spatial layer and a BL spatial layer.

Further, the present disclosure presents an example apparatus for wireless communications at a base station that may include a memory; and at least one processor coupled to the memory and configured to: determine, at the base station, downlink control information (DCI) for a first user equipment (UE), wherein the DCI for the first UE comprises modulation order information, spatial layer information, and power ratio information of the first UE, and a precoding matrix indicator (PMI) and spatial layer information of a second UE; and transmit the determined DCI to the first UE.

The present disclosure further includes wherein the first UE is a base layer (BL) UE and the second UE is an enhancement layer (EL) UE; wherein the first UE is a pre-Release 14 UE and the second UE is a Release 14 or later UE; or wherein the first UE and the second UE are Release 14 or later UEs.

In an aspect, the power ratio information is transmitted to the first UE and the second UE via radio resource control (RRC) signaling.

In an aspect, the power ratio information is a traffic to pilot ratio (TPR).

In an aspect, the TPR indicates a ratio of a total BL data resource element (RE) power over a reference signal power to the first UE.

In an aspect, the power ratio information includes a power ratio between an EL only spatial layer and a BL spatial layer.

Furthermore, the present disclosure presents an example non-transitory computer-readable medium storing computer executable code for wireless communications at a base station that may include a memory; and at least one processor coupled to the memory and configured to determine, at the base station, downlink control information (DCI) for a first user equipment (UE), wherein the DCI for the first UE comprises modulation order information, spatial layer information, and power ratio information of the first UE, and a precoding matrix indicator (PMI) and spatial layer information of a second UE; and transmit the determined DCI to the first UE.

The present disclosure further includes wherein the first UE is a base layer (BL) UE and the second UE is an enhancement layer (EL) UE or wherein the first UE is a pre-Release 14 UE and the second UE is a Release 14 or later UE.

The present disclosure further includes wherein the power ratio information is transmitted to the first UE and the second UE via radio resource control (RRC) signaling.

The present disclosure further includes wherein the power ratio information is a traffic to pilot ratio (TPR).

The present disclosure further includes wherein the TPR indicates a ratio of a total BL data resource element (RE) power over a reference signal power to the first UE.

The present disclosure further includes wherein the power ratio information includes a power ratio between an EL only spatial layer and a BL spatial layer.

The present disclosure presents an example method and apparatus for wireless communications. For example, the present disclosure presents an example method for wireless communications that may include determining, at a cell, one or more sets of information associated with downlink control information (DCI) enhancements for a first user equipment (UE) and a second UE, wherein the one or more sets of information comprises spatial layer information, modulation order information, and power ratio information, and transmitting the one or more sets of information to the first UE and the second UE with the first and the second UEs in communication with the cell.

Additionally, the present disclosure presents an example method for wireless communications that may include receiving, at a first user equipment (UE), one or more sets of information associated with downlink control information (DCI) enhancements of the first UE and a second UE, wherein the one or more sets of information comprises spatial layer information, modulation order information, and power ratio information, and decoding signals received at the first UE based on the one or more sets of the received spatial layer information, the modulation order information, and the power ratio information.

The present disclosure presents an example method and apparatus for wireless communications. For example, the present disclosure presents an example method for wireless communications that may include determining, at a cell, one or more sets of information associated with downlink control information (DCI) enhancements for a first user equipment (UE) and a second UE, wherein the one or more sets of information comprises spatial layer information, modulation order information, and power ratio information, and transmitting the one or more sets of information to the first UE and the second UE with the first and the second UEs in communication with the cell.

Additionally, the present disclosure presents an example method for wireless communications that may include receiving, at a first user equipment (UE), one or more sets of information associated with downlink control information (DCI) enhancements of the first UE and a second UE, wherein the one or more sets of information comprises spatial layer information, modulation order information, and power ratio information, and decoding signals received at the first UE based on the one or more sets of the received spatial layer information, the modulation order information, and the power ratio information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a flow diagram illustrating aspects of an example method according to aspects of the present disclosure;

DETAILED DESCRIPTION

Figure 1:
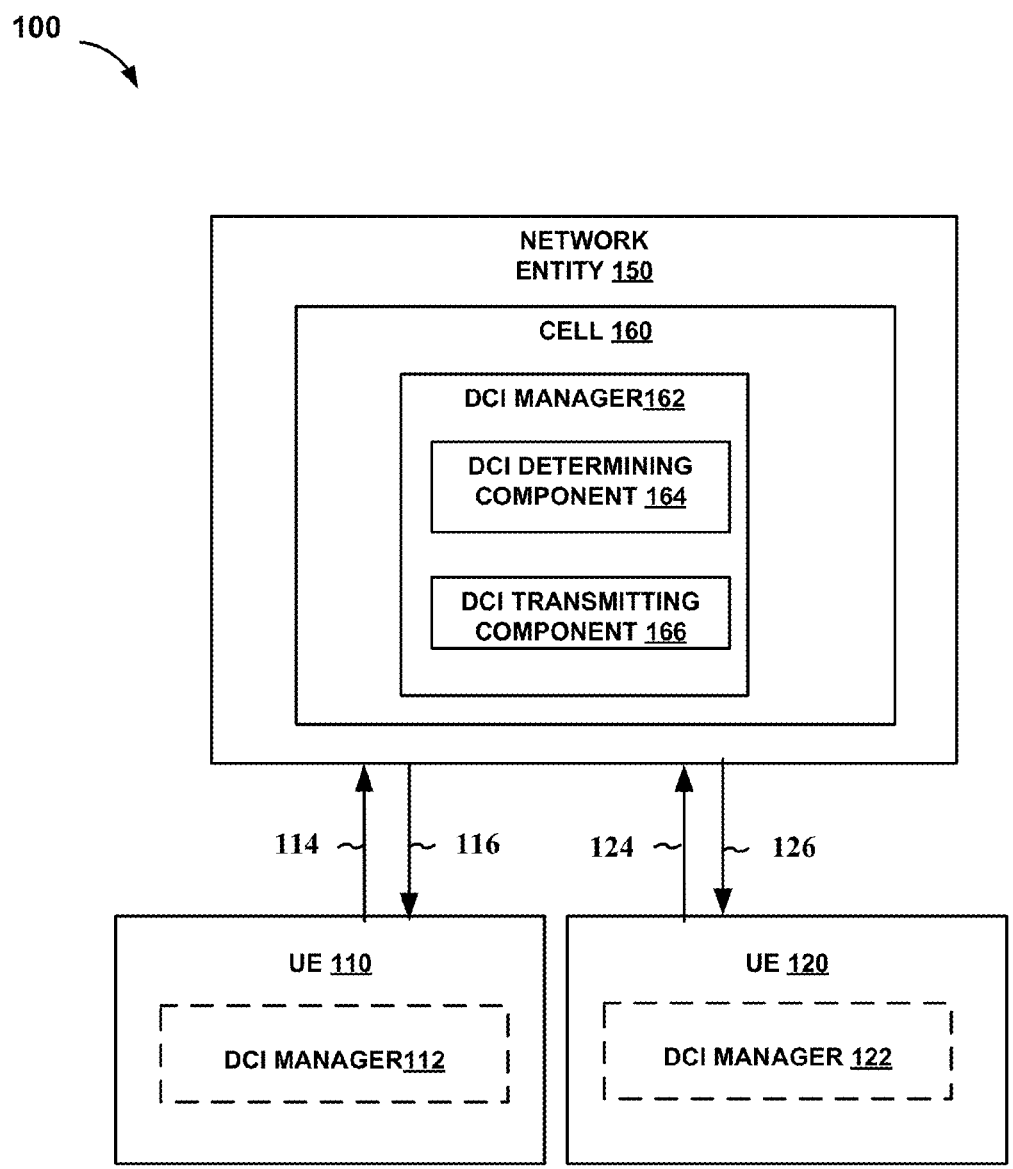
FIG. 1 is a block diagram illustrating an example wireless system according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present disclosure relates to cell 160 and/or DCI manager 162 transmitting DCI from a base station to one or more UEs. For example, a base station may determine DCI for a BL UE (e.g., UE 110) which may include modulation order information, spatial layer information, and power ratio information of UE 110, and a precoding matrix indicator (PMI) and spatial layer information of a second UE, and transmit the determined DCI to UE 110. On the receiving side, UE 110 may decode the signal transmitted to UE 110 using the DCI received from cell 160.

Referring to FIG. 1, a wireless communication system 100 is illustrated that facilitates wireless communications between network entity 150 and UEs 110 and/or 120. For example, wireless communication system 100 includes network entity 150 that may communicate with UE 110 via one or more over-the-air links, 114 and/or 116. In an aspect, network entity 150 may include one or more cells 160 for supporting communications with UE 110. In an aspect, for example, link 114 may be configured as an uplink (UL) for supporting communications from UE 110 to network entity 150 and/or cell 160, and link 116 may be configured as a downlink (DL) for supporting communications from network entity 150 and/or cell 160 to UE 110. Additionally, network entity 150 and/or cell 160 may communicate with UE 120 via one or more over-the-air links, 124 and/or 126. In an aspect, for example, link 124 may be configured as an uplink (UL) for supporting communications from UE 120 to network entity 150 and/or cell 160, and link 126 may be configured as a downlink (DL) for supporting communications from network entity 150 and/or cell 160 to UE 120.

In an aspect, cell 160 may multiplex UEs 110 and 120 in the power domain. That is, cell 160 may multiplex signals intended for UEs 110 and 120 in the power domain using non-orthogonal multiple access. For instance, in an aspect, cell 160 may multiplex signals intended for UE 110 and UE 120 as a base layer (BL) and an enhancement layer (EL) UE for non-orthogonal multiple access (NOMA) communications. On the receiving side, the multiplexed signal received at the UEs may be separated (e.g., decoded) at UE 110 and/or 120. For instance, an interference cancellation technique, e.g., successive interference cancellation (SIC) may be used to successfully decode the signal received at the UE or the interference may be ignored at the UE if the interference is relatively low. Although, the present disclosure discusses NOMA in the context of downlink communications, it is not limited to DL communications and may also be used for UL communications, e.g., on a multiple access channel.

For example, in an aspect, modulation order split may be used to implement NOMA. For instance, for a shared spatial layer, cell 160 may use a uniform combined constellation and each UE (e.g., UE 110 and/or 120) may be mapped to certain bits for the modulated symbol. For example, the combined constellation may be 64QAM and the BL may be using two most significant bits (MSBs) and the EL may be using the four lease significant bits (LSBs) resulting in a QPSK+16QAM split for the BL and EL, respectively. However, downlink control information (DCI) must be enhanced (e.g., modified, updated, etc.) for providing the additional information needed by the BL/EL UEs to successfully decode the signal transmitted from cell 160.

For example, in an aspect, cell 160 may transmit a signal to UEs 110 and 120 which may be configured to use the same frequency over the same time interval but may be configured differently in the power domain. For instance, cell 160 may transmit a stronger signal from cell to UE 110 as UE 110 is closer to the center of the cell and a weaker signal to UE 120 as UE 120 may be at the edges of cell 160. That is, cell 160 may transmit the same signal with varying powers to UEs 110 and 120 based on differences in their proximity to cell 160.

For instance, in an aspect, cell 160 may configure UE 110 as a base layer (BL) UE and UE 120 as an enhancement layer (EL) UE. The transmission to the BL UE (e.g., UE 110) is at a higher power (on the receiving end) and at a lower power (on the receiving end) based on their proximity to cell 160. UE 110 receives the multiplexed signal transmitted from cell 160, decodes the signal intended for UE 110 from the multiplexed signal transmitted from cell 160 by ignoring the signal intended for UE 120 as the signal intended for UE 120 may be considered as noise by UE 110 due to its relatively lower power (when compared to the power of the signal intended for UE 110). Additionally or optionally, UE 120 receives the multiplexed signal transmitted from cell 160, decodes the signal intended for UE 120 by using an interference cancellation technique, e.g., successive interference cancellation (SIC).

Further, in an aspect, UE 110 (e.g., BLUE) and UE 120 (e.g., EL UE) may be Release 14 (or later) UEs that support DCI enhancements which may include updated NOMA signaling. In an additional or optional aspect, for example, UE 110 (e.g., BL UE) may be a pre-Release 14 UE that may not be able to support the updated NOMA signaling and UE 120 (e.g., EL UE) may be a Release 14 (or later) UE that supports DCI enhancements. However, UE 110 which may not support Release 14 (or later) signaling may be able to interpret the signaling in such a way to decode the signal intended for UE 110.

In the present disclosure, cell 160 and/or DCI manager 162 assumes that the sets of resource blocks (RBs) assigned to the UEs (e.g., BL and EL UEs) are the same (not limited though) for simplicity in signaling, with no partial overlapping of resources. Further, the spatial layers used by a BL UE are a subset of the spatial layers used by the EL UE. Furthermore, cell 160 and/or DCI manager 162 may construct (e.g., implement, design, etc.) DCI from a single user DCI and may add extra fields (e.g., bits, etc.) to include information associated with other UEs so that the UE can successfully decode the transmitted signal multiplexed in the power domain. For example, the additional information included in DCI may include a BL/EL indicator (e.g., a bit indicating whether a UE is a BL/EL UE; spatial layer usage of the UE; and/or modulation order information, etc.).

In an aspect, network entity 150 may include one or more of any type of network components, for example, an access point, including a base station (BS) or Node B or eNodeB, a cell (e.g., cell 160), or a femto cell, a relay, a peer-to-peer device, an authentication, authorization and accounting (AAA) server, a mobile switching center (MSC), a radio network controller (RNC), etc., that can enable UEs 110 and/or 120 to communicate and/or establish and maintain links 114, 116, 124, and/or 126 to communicate with network entity 150.

In an additional aspect, UEs 110 and/or 120 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

For example, in an aspect, cell 160 may be configured with an instance of DCI manager 162 for communications between cell 160 and UEs 110/120. In an additional aspect, UEs 110 and/or UE 120 may be configured with an instance of DCI manager 112/122 for communications between UEs 110/120 and cell 160. Further, in an aspect, cell 160 and/or DCI manager 162 may determine, at the base station, downlink control information (DCI) for a first user equipment (UE), wherein the DCI for the first UE comprises modulation order information, spatial layer information, and power ratio information of the first UE, and a precoding matrix indicator (PMI) and spatial layer information of a second UE; and transmitting the determined DCI to the first UE. In an additional or optional aspect, UE 110 and/or DCI manager 112 may decode the signal transmitted from base station 160 based on the modulation order information, spatial layer information, and power ratio information of the UE 110, and a precoding matrix indicator (PMI) and spatial layer information of UE 120. In a further additional or optional aspect, UE 120 and/or DCI manager 122 may decode the signal transmitted from base station 160 based on the modulation order information, spatial layer information, and power ratio information of the UE 120, and a precoding matrix indicator (PMI) and spatial layer information of UE 110.

Figure 2:
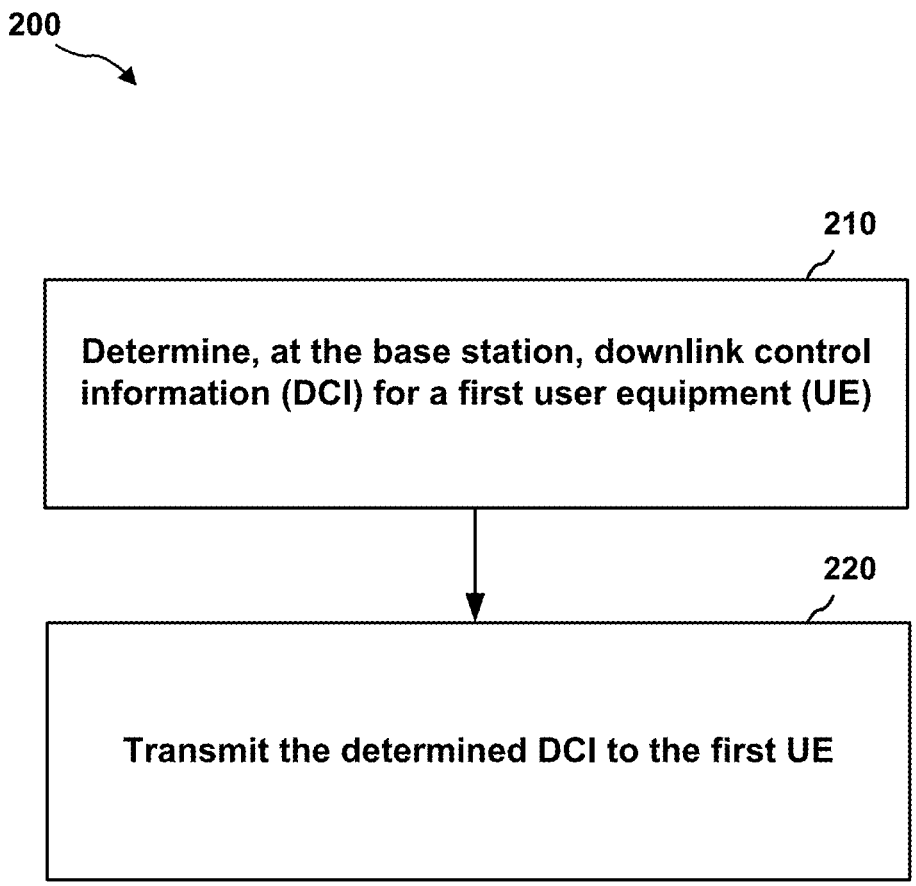
FIG. 2 is a flow diagram illustrating aspects of an example method according to aspects of the present disclosure.

FIG. 2 illustrates an example methodology 200 of wireless communications at cell 160, which may be executed by DCI manager 620 of FIG. 1, in an aspect of the present disclosure.

In an aspect, at block 210, methodology 200 may include determining, at the base station, downlink control information (DCI) for a first user equipment (UE), wherein the DCI for the first UE comprises modulation order information, spatial layer information, and power ratio information of the first UE and a precoding matrix indicator (PMI) and spatial layer information of a second UE. For example, in an aspect, cell 160 and/or DCI manager 162 may include a DCI determining component 164, such as a specially programmed processor module, or a processor executing specially programmed code stored in a memory to determine DCI 172 at cell 160 for UE 110, wherein DCI 172 for UE 110 comprises modulation order information, spatial layer information, and power ratio information associated of UE 110, and precoding matrix indicator (PMI) and spatial layer information of UE 120.

For instance, in an aspect, cell 160 and/or DCI manager 162 may determine DCI 172 for UE 110. In an aspect, DCI 172 for UE 110 may include modulation order information, spatial layer information, and power ratio information for UE 110. However, on the receiving side, UE 110 may need information associated with UE 120 for properly decoding the signal transmitted (or intended) to UE 110. Such information associated with UE 120 may include PMI and spatial layer information (e.g., spatial layer usage) of UE 120. Therefore, cell 160 and/or DCI manager 172 may include such information associated with UE 120 in DCI 172 for UE 110. In other words, DCI format for NOMA communications may be enhanced, updated, modified, etc. so that additional information associated with UE 120 may be included in DCI 172 so that UE 110 may successfully decode the signal transmitted to UE 110. That is, DCI in 3GPP Release 14 (or later releases) may be enhanced to support Release 14 (or later) UEs. The DCI enhancements may be implemented in such a way to provide backward compatibility with pre-Release 14 UEs. Similarly, DCI 174 that may be transmitted to UE 120 from cell 160 and/or DCH manager 162 may include modulation order information, spatial layer information, and power ratio information for UE 120 and may also include PMI and spatial layer usage information of UE 110.

In an aspect, for example, cell 160 and/or DCI manager 162 may use a common base precoding matrix for both UEs (e.g., UEs 110 and 120) and may signal the index (e.g., a column in the precoding matrix) of the common base precoding matrix to a UE via DCI. For example, cell 160 and/or DCI manager 162 may signal (e.g., transmit, send, etc.) the index to the common base precoding matrix associated with UE 110 to UE 110 via DCI 172 and/or signal the index to the common base precoding matrix associated with UE 120 to UE 120 via DCI 174. Additionally, cell 160 and/or DCI manager 162 may signal the spatial layers used by both the UEs to each UE. That is, cell 160 and/or DCI manager 162 may signal the spatial layers used by UEs 110 and 120 to UE 110 and UE 120. That is, in an aspect, cell 160 and/or DCI manager 162 may transmit information on the set of spatial layers used by BL UE 110 and EL UE 120 to BL UE 110. Similarly, cell 160 and/or DCI manager 162 may transmit information on the set of spatial layers used by EL UE 120 to EL UE 120 and BL UE 110. Although, the present disclosure describes the DCI enhancements in the context of UE 110, it applies to UE 120 with changes needed for the EL.

In an aspect, for example, cell 160 and/or DCI manager 162 may configure UE 110 with two spatial layers and/or UE 120 with four spatial layers. For instance, cell 160 and/or DCI manager 162 transmits information related to the spatial layers (e.g., columns of a precoding matrix, a 4×4 matrix) used by a UE (e.g., UE 110) to UEs 110 and 120, and vice versa.

In an aspect, cell 160 and/or DCI manager 162 may use two bitmaps to indicate to a first UE (e.g., UE 110) the spatial layers used by the first UE and a second UE (e.g., UE 120). The length of a bitmap used by cell 160 may be set based on the number of transmit (TX) antennas (e.g., 1, 2, 4, etc.) at cell 160. Further, in an aspect, the bitmap of one UE may be a subset of the bitmap of the other UE. That is, a bitmap used for UE 110 may be a subset of the bitmap used for UE 120, or vice versa. For example, with a total of four spatial layers (e.g., spatial layers 1, 2, 3, and 4, referred to as spatial layers 310, 320, 330, and 340 in FIG. 3; and spatial layers 460, 470, 480, and 490 in FIG. 4), cell 160 and/or DCI manager 162 may configure UE 110 to use spatial layers 1 and 2 and/or UE 120 to use spatial layers 1, 2, and 4. As such, the bitmap for spatial layers of UE 110 may be represented by "1100" and the bitmap for spatial layers of UE 120 may be represented by "1101." In an additional aspect, cell 160 and/or DCI manager 162 may use an additional bit (e.g., one additional bit) to indicate whether a UE is a BL UE or an EL UE.

In an additional or optional aspect, for example, cell 160 and/or DCI manager 162 may transmit a bitmap for UE 110 with the length of the bitmap set to the same size (e.g., length, etc.) as the number of TX antennas (e.g., 1, 2, 4, etc.) at cell 160 along with an extra bit indicating whether the UE is a BL UE or EL UE. Further, if the UE is a BL UE, the enhanced layers (ELs) may be indicated by a superset of the bitmap of the BL UE, and the second bitmap enumerates all "0" locations in the first bitmap. Additionally/optionally, if the UE is an EL UE, the BL layer usage may be a subset and the second bitmap enumerates all "1" locations in the first bitmap. This provides flexibility in allowing arbitrary spatial layer combinations, as described in examples below.

For example, if a UE is BL UE and it is configured for or served in spatial layers one and two (out of the four spatial layers), the paired EL UE will at least occupy spatial layer one and two (as it is a super set). Further, the paired EL UE can also occupy some or all the remaining spatial layers (e.g., spatial layers three and four). This can be indicated using a bitmap length of two bits not assigned to the BL UE. For example, if it is represented by "10," it means EL UE 120 occupies spatial layer three as well, which is an EL only spatial layer. In another example, if the UE is an EL UE and is served in spatial layers 1 and 2, the first bitmap may be "1100" to indicate spatial layers three and four are not assigned to UE 120. For the paired BL UE (e.g., UE 110), it can occupy one or more of spatial layers one and two (needs to be a subset). For instance, if the paired UE bitmap is "01," and two bits in length, it corresponds to the spatial layer one and two assigned to the EL UE 110. This bitmap "01" means the BL UE will occupy spatial layer two only.

In an aspect, if cell 160 and/or DCI manager 162 configures UE 110 as a BL UE (e.g., which may be indicated by an additional bit transmitted by cell 160) and uses bitmap "1100," UE 110 may interpret the received bitmap as being configured to use spatial layers 1 and 2. In such a scenario, the paired UE, UE 120 will considered as an EL UE and will at least use spatial layers 1 and 2, and a smaller bitmap will be needed to enumerate the "0" locations in UE 120 bitmap. For instance, if UE 120 uses a bitmap of "01," it means that out of the third and fourth spatial layers, UE 120 is only using the fourth spatial layer, represented by "1101" if a full bitmap is transmitted. This reduces the number of bits for transmitting bitmap information by taking advantage of the condition, dependency, or relationship that the BL UE is using spatial layers which may be a subset of EL UE spatial layers. In an additional example, if UE 110 is an EL UE and is using a bitmap of "1100," then UE 120 is a BL UE and may only use a subset of the first two spatial layers. The UE 120 bitmap can be "10," which means it is only using the first spatial layer.

In a further additional aspect, cell 160 and/or DCI manager 162 may use rank fields (e.g., two rank fields for two UEs) to indicate the spatial layers for a pair of UEs (e.g., UE 110 and UE 120). The rank information implies that a spatial layer set for a UE with a smaller rank may be a subset of spatial layer set for a paired UE with a higher rank. For example, in the context of rank information, if a precoding matrix with four columns is used, a rank of one may be generally defined as the UE using only the first column, a rank of two may be generally defined as the UE using the first two columns, and/or a rank of four may be generally defined as the UE using all four columns in the precoding matrix.

In an aspect, for example, a precoding matrix approach with two bitmaps may be used with a two transmit (TX) antenna system, a precoding matrix approach with just rank fields maybe used with a four TX antenna system, and/or an alternative codebook design may be used for an eight TX antenna system. In an additional aspect, a pre-Release 14 UE configured as a BL UE may be supported with less number of choices for precoding vectors for the BL UE. For example, in a four TX antenna system, a BL UE (e.g., UE 110) may use precoding matrix "0" and rank "1" (e.g., $1^{st}$ precoding vector) and an EL UE (e.g., UE 120) may use the same precoding matrix "0," and $1^{st}$, $3^{rd}$, and $4^{th}$ columns.

Additionally, in an aspect, a BL UE (e.g., UE 110) may need modulation order of an EL UE (e.g., UE 120) in each shared spatial layer and vice versa. However, for a modulation order split based receiver, the UE does not need to know the modulation and coding scheme (MCS) of the other UE (e.g., UE 120) if PMI and spatial layer usage of the other UE is available and the UE the does not plan to decode the other UE's information.

For instance, in an aspect, a single code word or two code words may be used and the code word to spatial layer mapping may be different between the two UEs. For instance, UE 110 may be configured to use spatial layers 1 and 2, and UE 120 may be configured to use spatial layers 1, 2, and 4. In an aspect, a codeword "CW1" may be used for UE 110 in spatial layer 1 and a codeword "CW2" may be used for UE 110 in layer 2. Similarly, a codeword "CW1" may be used for UE 120 in layers 1 and 2 and a codeword "CW2" may be used for UE 120 in layer 4. In an aspect, cell 160 and/or DCI manager 162 may transmit a modulation and coding scheme (MCS) of the second UE to the first UE and vice versa. This allows the UEs to have modulation order information of each other in addition to their own modulation order information. The MCS contains modulation order information and the coding rate. However, for some receivers, e.g., reduced complexity maximum likelihood (RML) receivers, only modulation order information is needed with PMI and spatial layer usage. The coding rate information is not needed.

Further, in an aspect, cell 160 and/or DCI manager 162 may transmit modulation order information of BL UE and EL UE to both the UEs. For instance, in an aspect, cell 160 and/or DCI manager 162 may use one bit to indicate to UE 110 whether the paired UE (e.g., UE 120) is using a single codeword (SCW) or a multi codeword (CW). If cell 160 and/or DCI manager 162 configures a UE with a SCW, cell 160 and/or DCI manager 162 may transmit a two-bit field to indicate the type of modulation used, e.g., 4QAM, 16QAM, 64QAM, or 256QAM. If cell 160 and/or DCI manager 162 configures a UE with a MCW, cell 160 and/or DCI manager 162 may transmit a pair (e.g., two) of two-bit fields which may indicate the modulation order of each of the code words in the MCW. In an additional or optional aspect, cell 160 and/or DCI manager 162 may not differentiate whether a SCW or MCW is used, and may transmit a pair of two-bit fields (e.g., two two-bit fields) to indicate the modulation order of each of the codeword. However, when a single codeword is used, relevant information may be sent/transmitted in one two-bit field and the information may be repeated in the other two-bit field.

In an aspect, cell 160 and/or DCI manager 162 may include a traffic-to-pilot (TPR) in the DCI transmitted to the UEs. TPR may be generally defined as a ratio of total data resource element (RE) power across all spatial layers and reference signal (e.g., common reference signal CRS)) power. Additionally, power ratio of an EL only spatial layer over power of a shared spatial layer or base layer may be transmitted to the UEs. Based on this information, UEs 110 and/or 120 may compute the power of each of the BL and EL only spatial layers, as described below in details in reference to FIGS. 3 and 4. In an additional or optional aspect, cell 160 may transmit CRS (as described above) or a demodulation reference (DMRS) signal to the UEs. For instance, if cell 160 transmits a CRS, TPR may be signaled via radio resource control (RRC) signaling. If cell 160 transmits a DM-RS, TPR may be set to 0 dB and no additional signaling is needed.

In an aspect, at block 220, methodology 200 may include transmitting the one or more sets of information to a first user equipment (UE) and a second UE. For example, in an aspect, cell 160 and/or DCI manager 162 may include a DCI transmitting component 166, such as a specially programmed processor module, or a processor executing specially programmed code stored in a memory, to transmit the one or more sets of information to a first UE (e.g., UE 110) and a second UE (e.g., UE 120). In an aspect, the first UE (e.g., UE 110) may be a base layer (BL) UE and the second UE (e.g., UE 120) may be enhancement layer UE. Once UE 110 receives the DCI 172 from cell 160, UE 110 decodes the signal transmitted from cell 160 using DCI 172 as described above. In a similar way, UE 120 decodes the signal transmitted from cell 160 using DCI 174.

Further, on the receiving side, UE 110 may decode the signal transmitted from cell 160 by ignoring the signal transmitted to UE 120 as the signal transmitted for US 120 is relatively weak (that is, when compared to the signal transmitted to UE 110). UE 110 may decode the signal based on DCI 172 transmitted to UE 110 as described below in detail in reference to FIGS. 3 and 4. Similarly, UE 120 may decode the signal transmitted to UE 120 by using SIC to cancel the signal transmitted to UE 110. Furthermore, in an aspect, UEs 110 and 120 may be Release 14 (or later) UEs that can support NOMA signaling to interpret DCI 172 and 174, respectively. In an additional aspect, UE 110 may be a pre-Release 14 UE with UE 120 being a Release 14 (or later UE), or both UEs are Release 14 (or later UEs).

In an additional aspect, DCI managers 112 and 122 may respectively decode the signals transmitted to UEs 110 and 120 based on the DCIs 172 and 174. Thus DCI enhancements may be implemented to provide more flexibility to support NOMA signaling.

Figure 3:
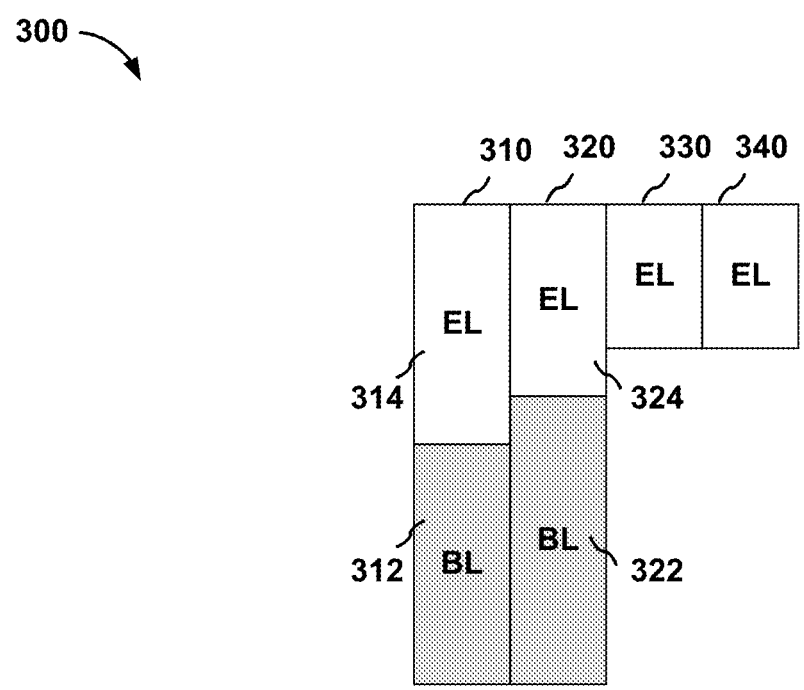
FIGS. 3 and 4 are charts illustrating example power splits according to aspects of the present disclosure.
Figure 4:
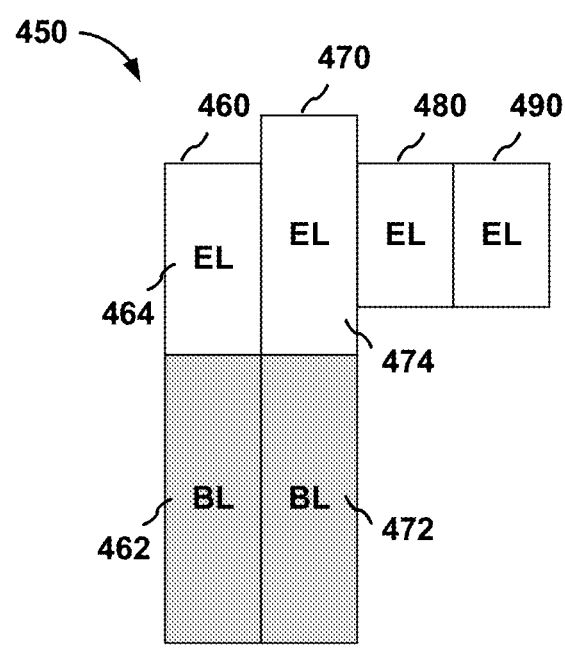

FIGS. 3 and 4 illustrate example power splits in aspects of the present disclosure.

FIG. 3 illustrates an example power split with four spatial layers (e.g., 310, 320, 330 and, 340) configured for a pair of UEs, BL UE 110 and EL UE 120. For example, spatial layers 310 and 320 are shared spatial layers (i.e., shared by BL UE 110 and EL UE 120) and spatial layers 330 and 340 are EL only spatial layers (e.g., configured for UE 120 only). In an aspect, BL UE 110 and EL UE 120 may be Release 14 (or later) UEs that can support (e.g., process, interpret, etc.) NOMA signaling transmitted from cell 160 which may include enhancements to DCI in Release 14 (or later).

For example, in an aspect, UEs 110 and 120 may be Release 14 (or later) UEs and may be configured as a pair, a BL UE and an EL UE, respectively. In such an aspect, two shared spatial layers (e.g., spatial layers 310 and 320) have the same total power and may be defined by traffic to pilot ratio (TPR) which is signaled or transmitted from cell 160. Further, the EL/BL power split may be different for the shared spatial layers as the modulation order split may be different for the shared spatial layers. Furthermore, the EL only spatial layers may have equal power and the power level of EL only spatial layers is defined as a ratio ("R") with respect to the total power of a shared spatial layer.

In an aspect, cell 160 may transmit DCI 172, a reference signal (e.g., common reference signal (CRS)), and/or a data signal to UE 110; DCI 174, a CRS and/or a data signal to UE 120. Additionally, cell 160 may also transmit TPR and power ratio "R" of EL only spatial layer power to shared spatial layer power. UE 110, upon receiving this information, may estimate the power of the CRS transmitted from a CRS port (e.g., CRS port "X") and compute total data power (e.g., total data power per RE) "Y." For example, Y=X*TPR. Further, based on the spatial layer information received from cell 160 via DCI 172, UE 110 has information that a total of four spatial layers are configured by cell 160 and that two of the spatial layers (e.g., spatial layers 1 and 2) are shared spatial layers (e.g., configured for both BL and EL UEs) and that the other two spatial layers (e.g., spatial layers 3 and 4) are configured as EL only spatial layers (e.g., configured for UE 120).

UE 110 further computes the power "PS" of a shared spatial layer. For example, PS=Y/(NS+(NEL Only*R)), wherein NS represents the number of shared spatial layers and NEL Only represents the number of EL only spatial layers. Therefore, based on two shared spatial layers and two EL only spatial layers, PS=Y/(2+(2*R)). Based on PS and R, UE 110 can compute the power of the EL only spatial layer. For example, PEL Only=PS*R. As a shared spatial layer includes a BL and an EL, UE 110 computes the power for BL and EL by splitting power PS. The power split may depend on the modulation order pair of BL and EL in the respective spatial layer as the modulation order pair may be different in different shared spatial layers. In an additional or optional aspect, another parameter may be signaled from cell 160 to provide more options for power split between BL and EL in each spatial layer. Although, the above description is in the context of BL UE 110, similar procedure may be used for determining the power of spatial layers associated with UE 120.

FIG. 4 illustrates another example power split in an example aspect of the present disclosure. For instance, FIG. 4 illustrates an example power split with four spatial layers (e.g., 460, 470, 480, and 490) configured for a pair of UEs, a BL UE 110 and EL UE 120. For example, spatial layers 460 and 470 are shared spatial layers (i.e., shared by BL and EL UEs) and spatial layers 470 and 490 are EL only spatial layers (e.g., configured for UE 120 only). In an aspect, BL UE 110 may be pre-Release 14 UE that may not be aware of an EL UE (e.g., UE 120) as pre-Release 14 UE may not support signaling for DCI enhancements and UE 120 is a Release 14 (or later) UE. However, in an additional aspect, BL UE 110 may be a Release 14 or later) UE and UE 120 may be a Release 14 (or later) UE that can support DCI enhancements.

For instance, BL UE 110 may be a pre-Release 14 UE and EL UE 120 may be a Release 14 (or later) UE. In such an aspect, for example, shared spatial layers (e.g., 460 and 470) may have different total power but the same BL power which may be defined by TPR, signaled to the UEs, e.g., via RRC signaling. The UEs (e.g., UEs 110 and 120) can calculate the power of pilot and may be able to compute the power of the data signal (e.g., of the BL) using the TPR received from cell 160. The power of ELs 464 and 474 of the shared spatial layers may be computed based on the modulation order split of the respective shared spatial layers. Further, as the modulation order in the shared spatial layers may be different, this may result in different total powers for the shared spatial layers.

In an additional aspect, EL only spatial layers (e.g., 480 and 490) may have equal power and the power of the EL only spatial layers may be computed in different ways. For example, in an aspect, the power of EL only spatial layer may be defined in relation to power of the BL in the shared spatial layer. In an additional or optional aspect, the power of EL only spatial layer may be defined in relation to power of the RS.

For example, in an aspect, cell 160 may transmit DCI 172, a reference signal (e.g., common reference signal (CRS)), and/or a data signal to UE 110; DCI 174, a CRS and/or a data signal to UE 120. Additionally, cell 160 may also transmit TPR and power ratio "R" of EL only spatial layer power to shared spatial layer power. The TPR is interpreted by BL UE 110 (which is not aware of the existence of EL UE 120) as a ratio of total BL data RE power across all spatial layers and CRS power. UE 110, upon receiving this information, may estimate the power of the CRS transmitted from a CRS port (e.g., CRS port "X") and compute total BL data RE power (e.g., total BL data power per RE) "Y." For example, Y=X*TPR. Further, based on the spatial layer information received from cell 160 via DCI 172, UE 110 has information that two of the spatial layers (e.g., spatial layers one and two) are configured for BL UE 110. However, EL UE 120, which can interpret Release 14 (or later) signaling understands that a total of four spatial layers were configured by cell 160 and that two of the spatial layers (e.g., spatial layers 1 and 2) are shared spatial layers and that the other two spatial layers (e.g., spatial layers 3 and 4) are configured as EL only spatial layers (e.g., configured for UE 120).

Further, UE 110 computes the power "$P_S$" of a shared spatial layer. For example, $P_S=Y/N_{BL}$, wherein $N_{BL}$ is the number of BL spatial layers for BL UE 110. That is, $P_S=Y/2$, as there are two base layers (e.g., BLs 462 and 472). Furthermore, EL UE 120 has knowledge of the two shared spatial layers and two EL only spatial layers and also the ratio "R" for EL only spatial layer power to shared spatial layer power. However, within each shared spatial layer, if the power ratio of EL to BL is "Z," the EL power "Q" is computed, e.g., $Q=P_S*Z$, wherein Z depends on the modulation order pair of BL and EL in that spatial layer considering that the modulation order pair can be different for different shared spatial layers. In an aspect, another parameter may be introduced to add more choices to the power split between the layers in a shared spatial layer. For example, for spatial layer one (460), $Q_1=P_S*Z_1$; and $Q_2=P_S*Z_2$; where $Z_1$ and $Z_2$ can be different in two shared spatial layers. Furthermore, the EL only spatial layer power may be computed by averaging the shared spatial layer powers, e.g., $Q_{Average}=(Q_1+Q_2)/2$ and multiplying with the signaled ratio "R," e.g., EL only layer power $Q=Q_{Average}*R$.

Thus as described above, the powers of BL and EL layers of each of the shared spatial layers and EL only spatial layers may be computed for successfully decoding the signals transmitted from cell 160 to UEs 110 and/or 120. In an aspect, DCI manager 112 may be perform the decoding and/or DCI manager 122 may perform the decoding the UE 120.

Figure 5:
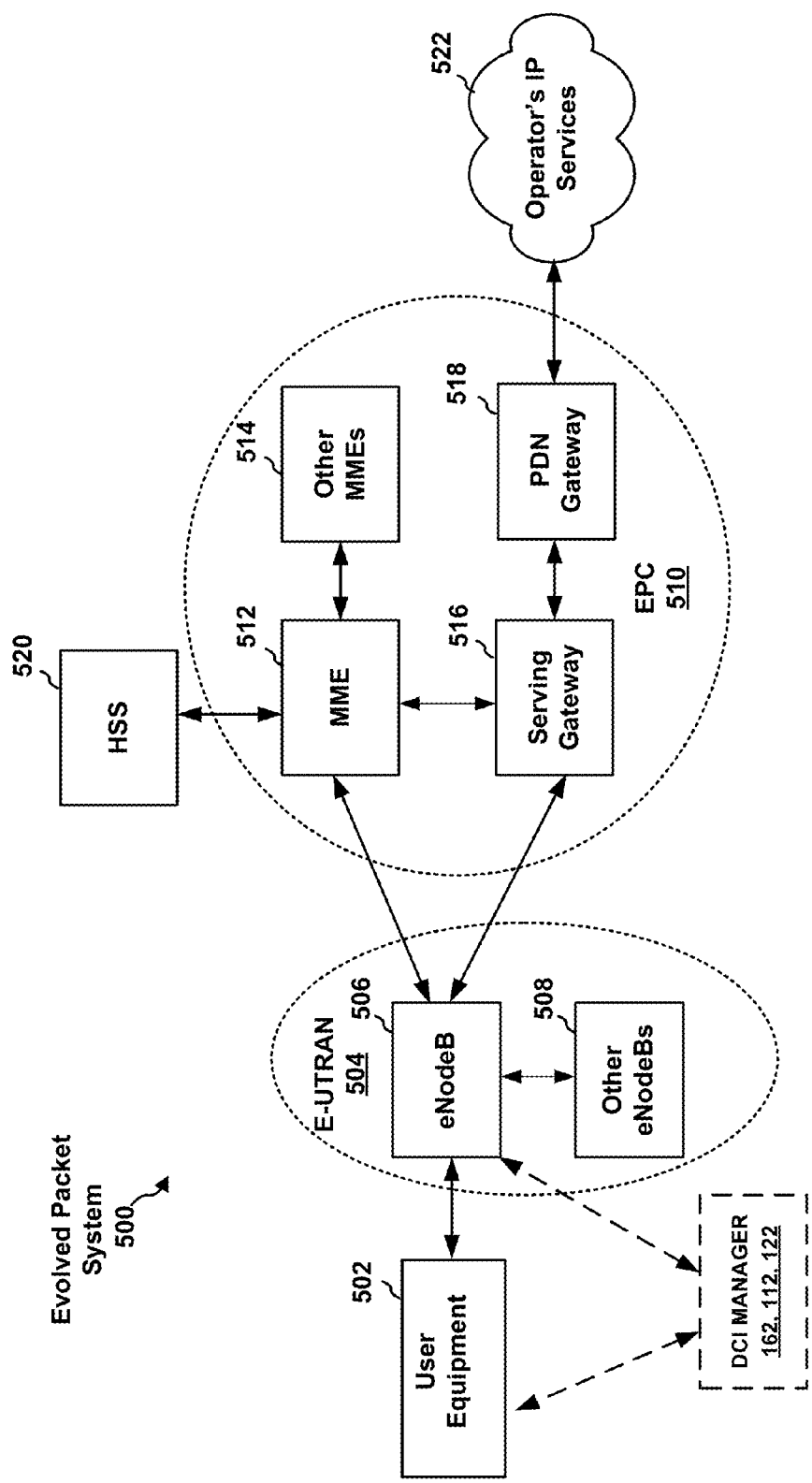
FIG. 5 is a diagram illustrating an example of a network architecture according to aspects of the present disclosure.

FIG. 5 is a diagram illustrating LTE network architecture 500. The LTE network architecture 500 may be referred to as an Evolved Packet System (EPS). The EPS may include one or more of cell 160 which be same or similar to cell 160 of FIG. 1, UE 502 which may be same or similar to UEs 110/120 of FIG. 1, and one or more of the cell and the UEs may include an instance of DCI manager 162, 112, and/or 122 (FIG. 1) and configured for wireless communications. Additionally, EPS includes an Evolved UMTS Terrestrial Radio Access Network (E-UTRAN) 504, an Evolved Packet Core (EPC) 510, a Home Subscriber Server (HSS) 520, and an Operator's IP Services 522. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 506 and other eNBs 508. The eNB 506 provides user and control planes protocol terminations toward the UE 502. The eNB 506 may be connected to the other eNBs 508 via a backhaul (e.g., an X2 interface). The eNB 506 may also be referred to as a base station, a base transceiver station, a radio base station, a radio transceiver, a transceiver function, a basic service set (BSS), an extended service set (ESS), or some other suitable terminology. The eNB 506 provides an access point to the EPC 510 for a UE 502. Examples of UEs 502 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 502 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 506 is connected by an S6 interface to the EPC 510. The EPC 510 includes a Mobility Management Entity (MME) 512, other MMEs 514, a Serving Gateway 516, and a Packet Data Network (PDN) Gateway 518. The MME 512 is the control node that processes the signaling between the UE 502 and the EPC 510. Generally, the MME 512 provides bearer and connection management. All user IP packets are transferred through the Serving Gateway 516, which itself is connected to the PDN Gateway 518. The PDN Gateway 518 provides UE IP address allocation as well as other functions. The PDN Gateway 518 is connected to the Operator's IP Services 522. The Operator's IP Services 522 may include the Internet, the Intranet, an IP Multimedia Subsystem (IMS), and a PS Streaming Service (PSS).

Figure 6:
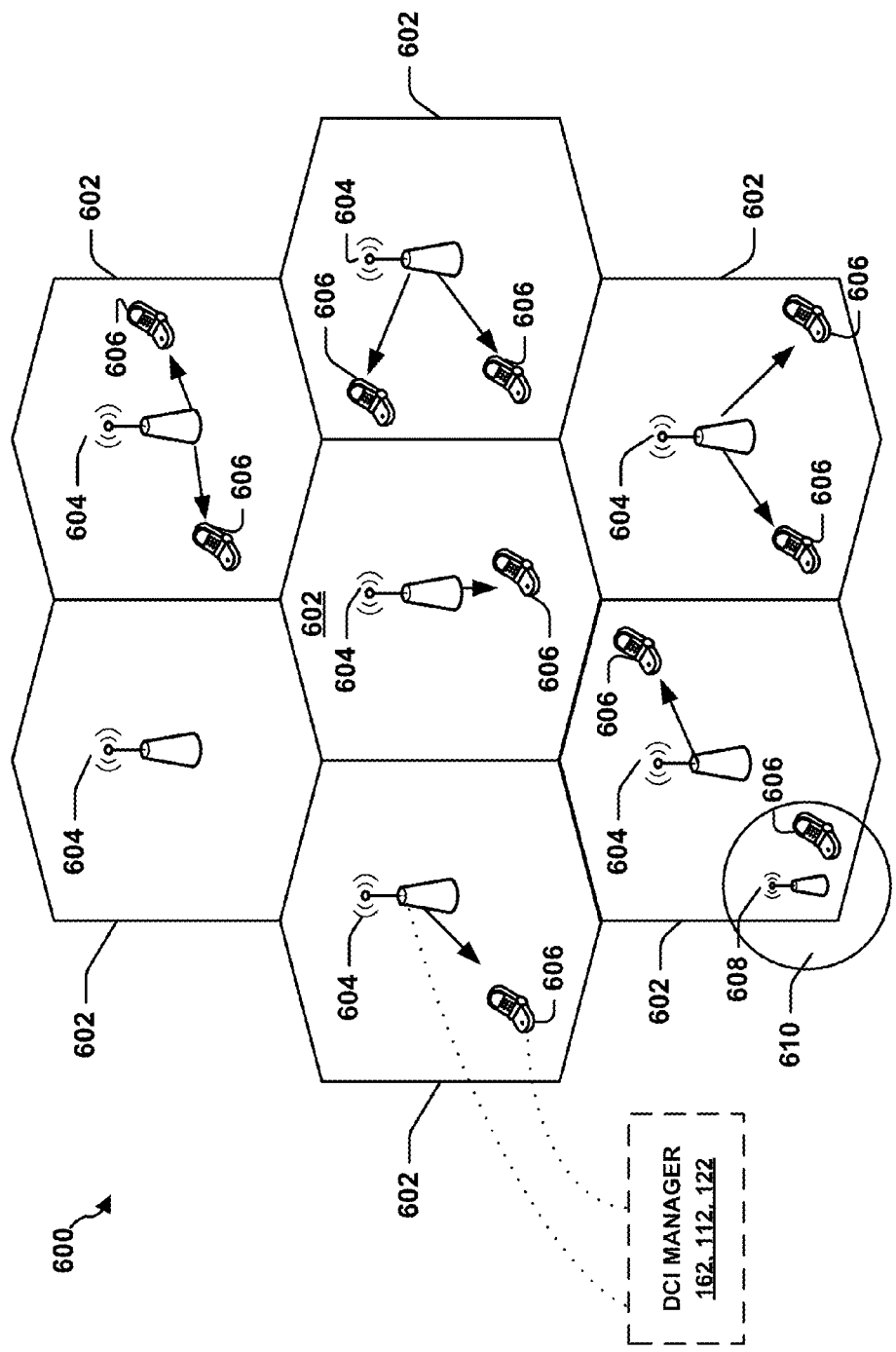
FIG. 6 is a diagram illustrating an example of an access network according to aspects of the present disclosure.

FIG. 6 is a diagram illustrating an example of an access network 600 in an LTE network architecture in which eNBs 604 and/or UEs 606 may each include DCI manager (162, 112, and 122), as discussed herein. In an aspect, UE 606 may be the same or similar to UE 110, 120 of FIG. 1 and/or cell 602 may be the same or similar to cell 160 of FIG. 1. In this example, the access network 600 is divided into a number of cellular regions (cells) 602. One or more lower power class eNBs 608 may have cellular regions 610 that overlap with one or more of the cells 602. The lower power class eNB 608 may be a femto cell (e.g., home eNB (HeNB)), pico cell, micro cell, or remote radio head (RRH). The macro eNBs 604 are each assigned to a respective cell 602 and are configured to provide an access point to the EPC 510 for all the UEs 606 in the cells 602. There is no centralized controller in this example of an access network 600, but a centralized controller may be used in alternative configurations. The eNBs 604 are responsible for all radio related functions including radio bearer control, admission control, mobility control, scheduling, security, and connectivity to the serving gateway 516.

The modulation and multiple access scheme employed by the access network 600 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA 2000 family of standards and employs CDMA to provide broadband Internet access to mobile stations.

These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA 2000 and UMB are described in documents from the 3GPP2 organization. The actual wireless communication standard and the multiple access technology employed will depend on the specific application and the overall design constraints imposed on the system.

The eNBs 604 may have multiple antennas supporting MIMO technology. The use of MIMO technology enables the eNBs 604 to exploit the spatial domain to support spatial multiplexing, beamforming, and transmit diversity. Spatial multiplexing may be used to transmit different streams of data simultaneously on the same frequency. The data steams may be transmitted to a single UE 606 to increase the data rate or multiple UEs 606 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 606 with different spatial signatures, which enables each of the UE(s) 606 to recover the one or more data streams destined for that UE 606. On the UL, each UE 606 transmits a spatially precoded data stream, which enables the eNB 604 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 7:
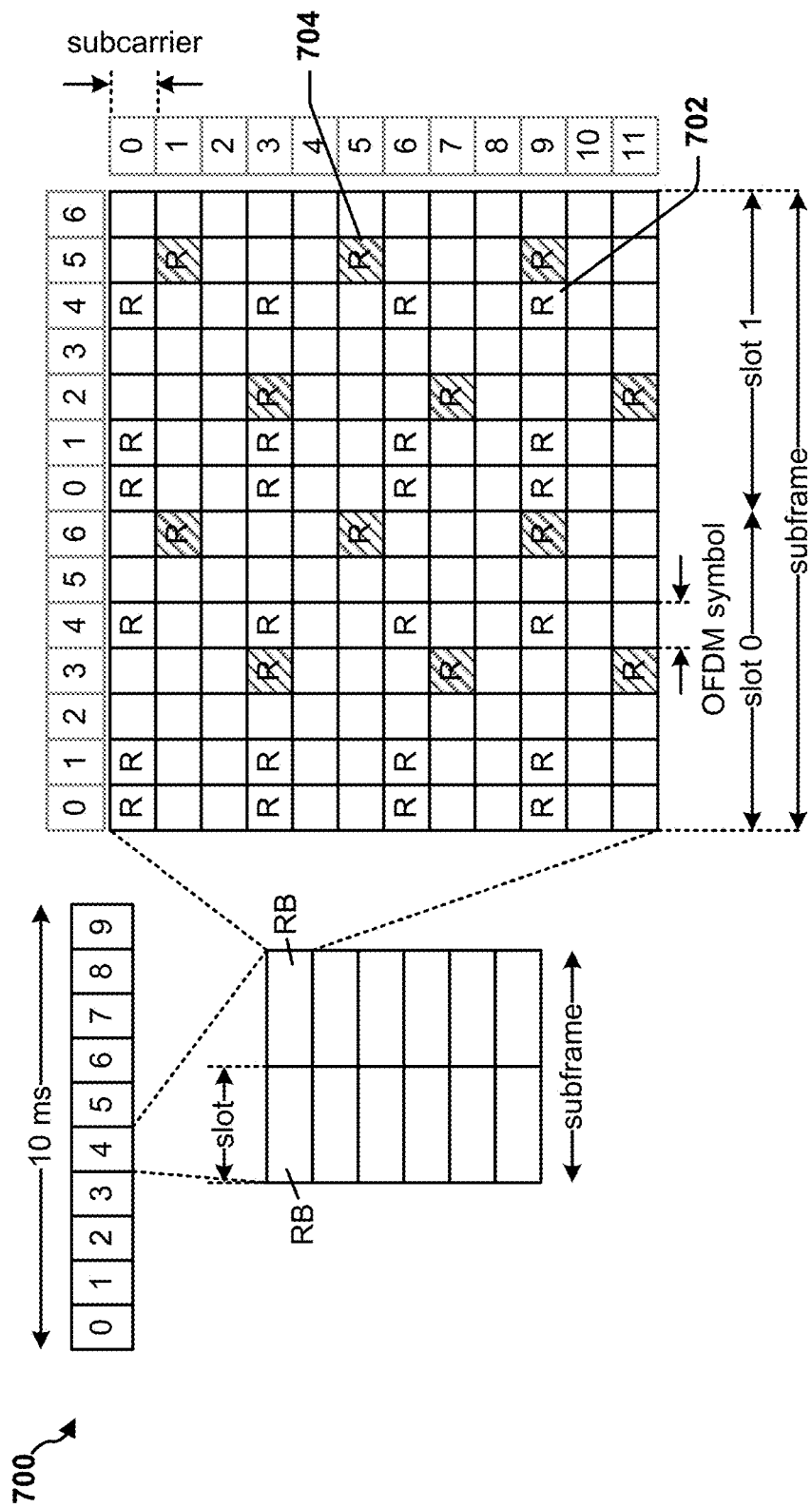
FIG. 7 is a diagram illustrating an example of a DL frame structure in LTE according to aspects of the present disclosure.

FIG. 7 is a diagram 700 illustrating an example of a DL frame structure in LTE, which may be received by a UE, such as UE 110, 120 (FIG. 1). A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 702, 704, include DL reference signals (DL-RS). The DL-RS include Cell-specific RS (CRS) (also sometimes called common RS) 702 and UE-specific RS (UE-RS) 704. UE-RS 704 are transmitted only on the resource blocks upon which the corresponding physical DL shared channel (PDSCH) is mapped. The number of bits carried by each resource element depends on the modulation scheme. Thus, the more resource blocks that a UE, such as UE 110, 120 of FIG. 1 including DCI manager 112, 122, receive the higher the modulation scheme, the higher the data rate for the UE.

Figure 8:
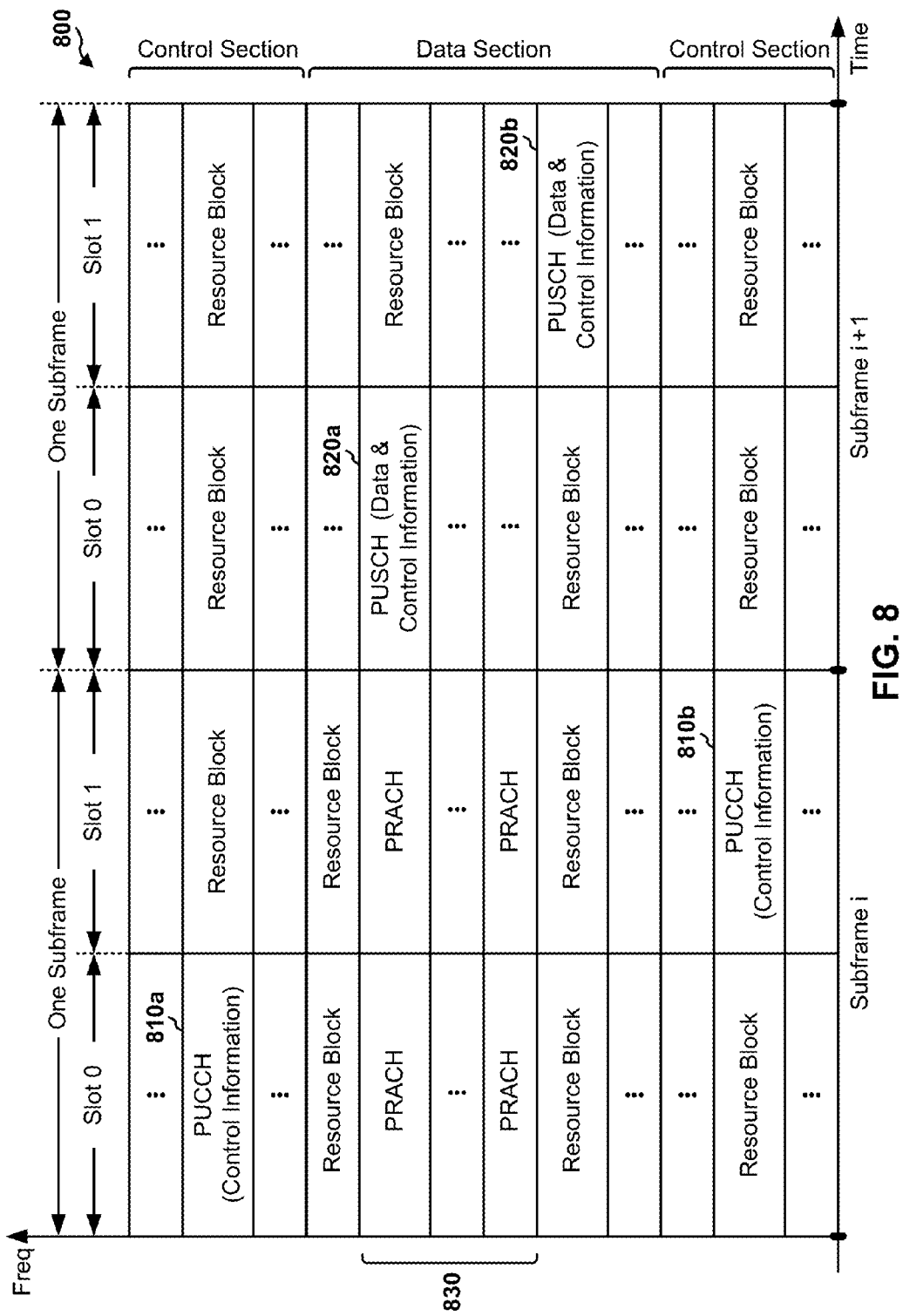
FIG. 8 is a diagram illustrating an example of an UL frame structure in LTE according to aspects of the present disclosure.

FIG. 8 is a diagram 800 illustrating an example of an UL frame structure in LTE, which may be transmitted by a UE, such as UE 110, 120 (FIG. 1) that may include DCI manager 112, 122 (FIG. 1), as described herein. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE, such as UE 110, 120 (FIG. 1) including DCI manager 112, 122, may be assigned resource blocks 810*a*, 810*b* in the control section to transmit control information to an eNB. The UE may also be assigned resource blocks 820*a*, 820*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 830. The PRACH 830 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 9:
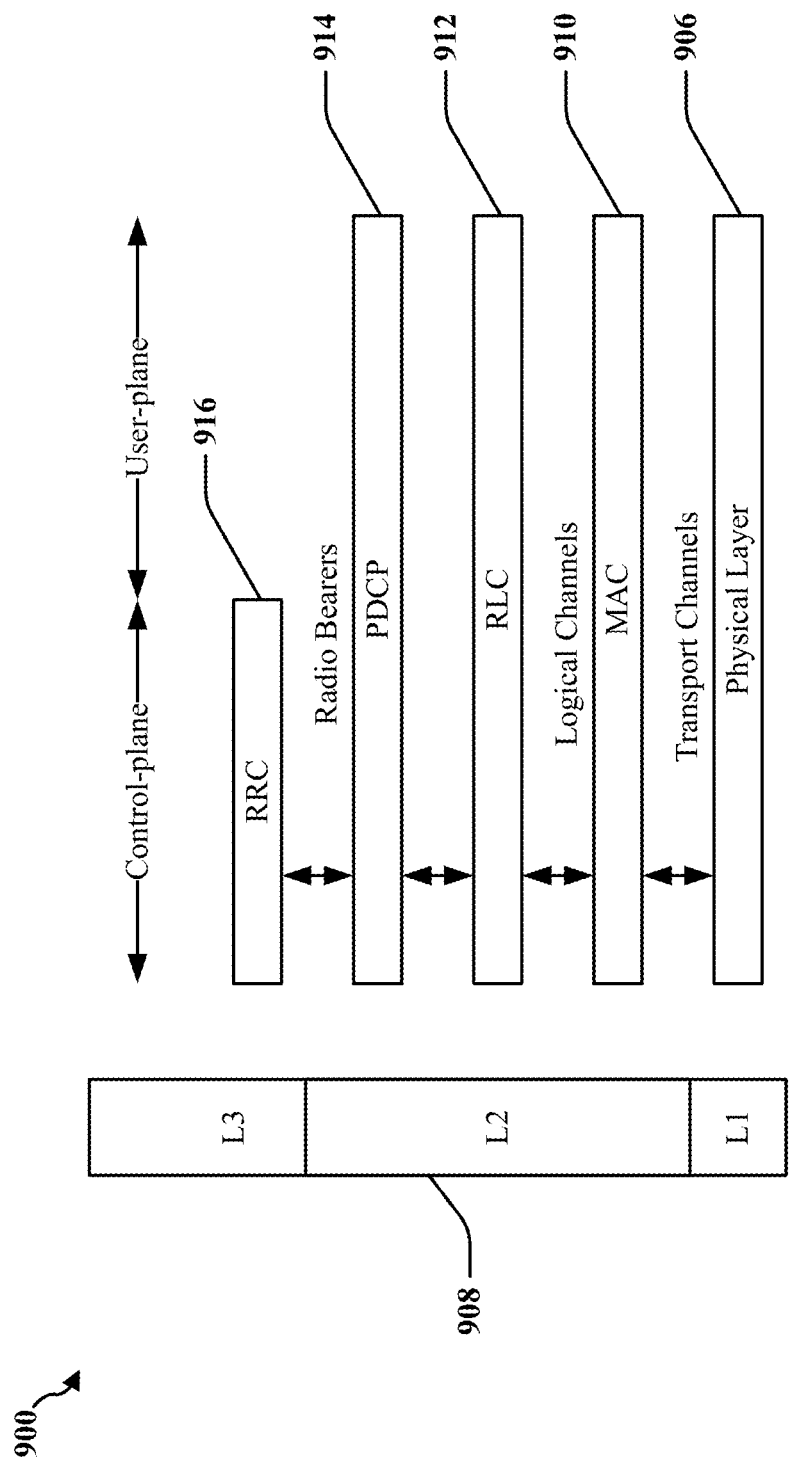
FIG. 9 is a diagram illustrating an example of a radio protocol architecture for the user and control planes according to aspects of the present disclosure.

FIG. 9 is a diagram 1000 illustrating an example of a radio protocol architecture for the user and control planes in LTE. The radio protocol architecture may be used by a cell, such as cell 160, and/or a UE, such as UE 110, 120 (FIG. 1), which may include an instance of DCI manager (e.g., 162, 112, 122). The radio architecture includes three layers: Layer 1, Layer 2, and Layer 3. Layer 1 (L1 layer) is the lowest layer and implements various physical layer signal processing functions. The L1 layer will be referred to herein as the physical layer 906. Layer 2 (L2 layer) 908 is above the physical layer 906 and is responsible for the link between the UE and eNB over the physical layer 906.

In the user plane, the L2 layer 908 includes a media access control (MAC) sublayer 910, a radio link control (RLC) sublayer 912, and a packet data convergence protocol (PDCP) 914 sublayer, which are terminated at the eNB on the network side. Although not shown, the UE may have several upper layers above the L2 layer 908 including a network layer (e.g., IP layer) that is terminated at the PDN gateway 518 on the network side, and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between eNBs. The RLC sublayer 912 provides segmentation and reassembly of upper layer data packets, retransmission of lost data packets, and reordering of data packets to compensate for out-of-order reception due to hybrid automatic repeat request (HARQ). The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

In the control plane, the radio protocol architecture for the UE and eNB is substantially the same for the physical layer 906 and the L2 layer 908 with the exception that there is no header compression function for the control plane. The control plane also includes a radio resource control (RRC) sublayer 916 in Layer 3 (L3 layer). The RRC sublayer 916 is responsible for obtaining radio resources (i.e., radio bearers) and for configuring the lower layers using RRC signaling between the eNB and the UE.

Figure 10:
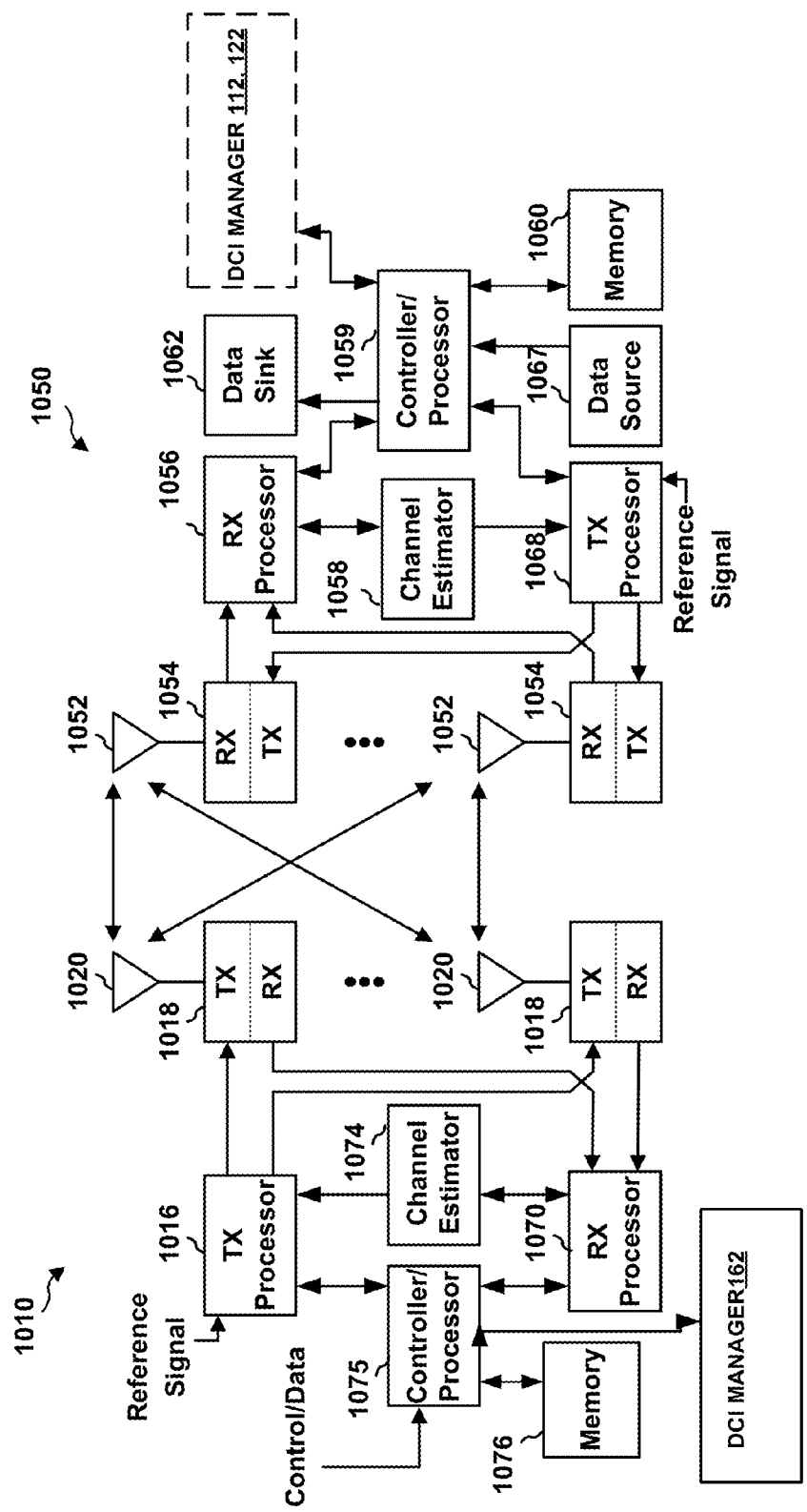
FIG. 10 is a diagram illustrating an example of an evolved Node B and user equipment in an access network according to aspects of the present disclosure.

FIG. 10 is a block diagram of an eNB 1010 in communication with a UE 1050 in an access network. eNB 1010 may the same or similar as cell 160 including DCI manager 162 and UE 1050 may be the same or similar as UE 110, 120 including DCI manager 112, 122 of FIG. 1. In the DL, upper layer packets from the core network are provided to a controller/processor 1075. The controller/processor 1075 implements the functionality of the L2 layer. In the DL, the controller/processor 1175 provides header compression, ciphering, packet segmentation and reordering, multiplexing between logical and transport channels, and radio resource allocations to the UE 1050 based on various priority metrics. The controller/processor 1075 is also responsible for HARQ operations, retransmission of lost packets, and signaling to the UE 1050.

The transmit (TX) processor 1016 implements various signal processing functions for the L1 layer (i.e., physical layer). The signal processing functions includes coding and interleaving to facilitate forward error correction (FEC) at the UE 1050 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1074 may be used to determine the coding and modulation scheme, as well as for spatial processing. The channel estimate may be derived from a reference signal and/or channel condition feedback transmitted by the UE 1050. Each spatial stream is then provided to a different antenna 1020 via a separate transmitter 1018TX. Each transmitter 1018TX modulates an RF carrier with a respective spatial stream for transmission.

At the UE 1050, each receiver 1054RX receives a signal through its respective antenna 1052. Each receiver 1054RX recovers information modulated onto an RF carrier and provides the information to the receive (RX) processor 1056. The RX processor 1056 implements various signal processing functions of the L1 layer. The RX processor 1056 performs spatial processing on the information to recover any spatial streams destined for the UE 1050. If multiple spatial streams are destined for the UE 1050, they may be combined by the RX processor 1056 into a single OFDM symbol stream.

The RX processor 1056 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1010. These soft decisions may be based on channel estimates computed by the channel estimator 1058. The soft decisions are then decoded and deinterleaved to recover the data and control signals that were originally transmitted by the eNB 1010 on the physical channel. The data and control signals are then provided to the controller/processor 1059.

The controller/processor 1059 implements the L2 layer. The controller/processor can be associated with a memory 1060 that stores program codes and data. The memory 1060 may be referred to as a computer-readable medium. In the UL, the controller/processor 1059 provides demultiplexing between transport and logical channels, packet reassembly, deciphering, header decompression, control signal processing to recover upper layer packets from the core network. The upper layer packets are then provided to a data sink 1062, which represents all the protocol layers above the L2 layer. Various control signals may also be provided to the data sink 1062 for L3 processing. The controller/processor 1059 is also responsible for error detection using an acknowledgement (ACK) and/or negative acknowledgement (NACK) protocol to support HARQ operations.

In the UL, a data source 1067 is used to provide upper layer packets to the controller/processor 1059. The data source 1067 represents all protocol layers above the L2 layer. Similar to the functionality described in connection with the DL transmission by the eNB 1010, the controller/processor 1059 implements the L2 layer for the user plane and the control plane by providing header compression, ciphering, packet segmentation and reordering, and multiplexing between logical and transport channels based on radio resource allocations by the eNB 1010. The controller/processor 1059 is also responsible for HARQ operations, retransmission of lost packets, and signaling to the eNB 1010.

Channel estimates derived by a channel estimator 1058 from a reference signal or feedback transmitted by the eNB 1010 may be used by the TX processor 1068 to select the appropriate coding and modulation schemes, and to facilitate spatial processing. The spatial streams generated by the TX processor 1068 are provided to different antenna 1052 via separate transmitters 1054TX. Each transmitter 1054TX modulates an RF carrier with a respective spatial stream for transmission.

The UL transmission is processed at the eNB 1010 in a manner similar to that described in connection with the receiver function at the UE 1050. Each receiver 1018RX receives a signal through its respective antenna 1020. Each receiver 1018RX recovers information modulated onto an RF carrier and provides the information to a RX processor 1070. The RX processor 1070 may implement the L1 layer.

The controller/processor 1075 implements the L2 layer. The controller/processor 1075 can be associated with a memory 1076 that stores program codes and data. The memory 1076 may be referred to as a computer-readable medium. In the UL, the controller/processor 1075 provides demultiplexing between transport and logical channels, packet reassembly, deciphering, header decompression, control signal processing to recover upper layer packets from the UE 1050. Upper layer packets from the controller/processor 1075 may be provided to the core network. The controller/processor 1075 is also responsible for error detection using an ACK and/or NACK protocol to support HARQ operations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of non-orthogonal multiple access (NOMA) wireless communication at a base station, comprising:
determining, at the base station, downlink control information (DCI) for a first user equipment (UE), wherein the DCI for the first UE is enhanced with control information associated with a second UE, wherein the DCI for the first UE indicates modulation order information, spatial layer information, and power ratio information of the first UE, and a precoding matrix indicator (PMI) and spatial layer information of the second UE to enable the first UE to decode a multiplexed signal intended for both the first UE and the second UE using NOMA wireless communication; and
transmitting the determined DCI to the first UE.

2. The method of claim 1, wherein the second UE is a base layer (BL) UE and the first UE is an enhancement layer (EL) UE.

3. The method of claim 2, wherein the second UE is a pre-Release 14 UE and the first UE is a Release 14 or later UE.

4. The method of claim 3, wherein the power ratio information is transmitted to the first UE and the second UE via radio resource control (RRC) signaling.

5. The method of claim 4, wherein the power ratio information is a traffic to pilot ratio (TPR).

6. The method of claim 5, wherein the TPR indicates a ratio of a total BL data resource element (RE) power over a reference signal power to the first UE.

7. The method of claim 2, wherein the power ratio information includes a power ratio between an EL only spatial layer and a BL spatial layer.

8. The method of claim 1, wherein the first UE and the second UE are Release 14 or later UEs.

9. An apparatus for non-orthogonal multiple access (NOMA) wireless communication at a base station, comprising:
means for determining, at the base station, downlink control information (DCI) for a first user equipment (UE), wherein the DCI for the first UE is enhanced with control information associated with a second UE, wherein the DCI for the first UE indicates modulation order information, spatial layer information, and power ratio information of the first UE, and a precoding matrix indicator (PMI) and spatial layer information of the second UE to enable the first UE to decode a multiplexed signal intended for both the first UE and the second UE using NOMA wireless communication; and
means for transmitting the determined DCI to the first UE.

10. The apparatus of claim 9, wherein the second UE is a base layer (BL) UE and the first UE is an enhancement layer (EL) UE.

11. The apparatus of claim 10, wherein the second UE is a pre-Release 14 UE and the first UE is a Release 14 or later UE.

12. The apparatus of claim 11, wherein the power ratio information is transmitted to the first UE and the second UE via radio resource control (RRC) signaling.

13. The apparatus of claim 12, wherein the power ratio information is a traffic to pilot ratio (TPR).

14. The apparatus of claim 13, wherein the TPR indicates a ratio of a total BL data resource element (RE) power over a reference signal power to the first UE.

15. The apparatus of claim 10, wherein the power ratio information includes a power ratio between an EL only spatial layer and a BL spatial layer.

16. An apparatus for non-orthogonal multiple access (NOMA) wireless communication at a base station, comprising:
a memory; and
at least one processor coupled to the memory and configured to:
determine, at the base station, downlink control information (DCI) for a first user equipment (UE), wherein the DCI for the first UE is enhanced with control information associated with a second UE, wherein the DCI for the first UE indicates modulation order information, spatial layer information, and power ratio information of the first UE, and a precoding matrix indicator (PMI) and spatial layer information of the second UE to enable the first UE to decode a multiplexed signal intended for both the first UE and the second UE using NOMA wireless communication; and
transmit the determined DCI to the first UE.

17. The apparatus of claim 16, wherein the second UE is a base layer (BL) UE and the first UE is an enhancement layer (EL) UE.

18. The apparatus of claim 17, wherein the power ratio information includes a power ratio between an EL only spatial layer and a BL spatial layer.

19. The apparatus of claim 17, wherein the second UE is a pre-Release 14 UE and the first UE is a Release 14 or later UE.

20. The apparatus of claim 19, wherein the power ratio information is transmitted to the first UE and the second UE via radio resource control (RRC) signaling.

21. The apparatus of claim 20, wherein the power ratio information is a traffic to pilot ratio (TPR).

22. The apparatus of claim 21, wherein the TPR indicates a ratio of a total BL data resource element (RE) power over a reference signal power to the first UE.

23. The apparatus of claim 16, wherein the first UE and the second UE are Release 14 or later UEs.

24. A non-transitory computer-readable medium storing computer executable code for non-orthogonal multiple access (NOMA) wireless communication at a base station, comprising:
code for determining, at the base station, downlink control information (DCI) for a first user equipment (UE), wherein the DCI for the first UE is enhanced with control information associated with a second UE, wherein the DCI for the first UE indicates modulation order information, spatial layer information, and power ratio information of the first UE, and a precoding matrix indicator (PMI) and spatial layer information of the second UE to enable the first UE to decode a multiplexed signal intended for both the first UE and the second UE using NOMA wireless communication; and
code for transmitting the determined DCI to the first UE.

25. A method of wireless non-orthogonal multiple access (NOMA) communication of a first user equipment (UE), comprising:
receiving, at the first UE from a base station, downlink control information (DCI) for the first UE, wherein the DCI for the first UE is enhanced with control information associated with a second UE, wherein the DCI for the first UE indicates modulation order information, spatial layer information, and power ratio information of the first UE, and a precoding matrix indicator (PMI) and spatial layer information of the second UE; and decoding a multiplexed signal intended for both the first UE and the second UE using NOMA wireless communication received at the first UE based on the DCI.

26. The method of claim 25, wherein the first UE is an enhancement layer (EL) UE and second UE is a base layer (BL) UE.

27. The method of claim 26, wherein the first UE is a Release 14 or later UE and the second UE is a pre-Release 14 UE.

28. The method of claim 27, wherein the power ratio information includes a power ratio between an EL only spatial layer and a BL spatial layer.

29. The method of claim 27, wherein the power ratio information is received by the first UE via radio resource control (RRC) signaling from the base station.

30. The method of claim 29, wherein the power ratio information is a traffic to pilot ratio (TPR).

31. The method of claim 30, wherein the TPR indicates a ratio of a total BL data resource element (RE) power over a reference signal power to the first UE.

32. A first user equipment (UE) for non-orthogonal multiple access (NOMA) wireless communication, comprising:
a memory; and
at least one processor coupled to the memory and configured to:
receive, from a base station, downlink control information (DCI) for the first UE, wherein the DCI for the first UE is enhanced with control information associated with a second UE, wherein the DCI for the first UE indicates modulation order information, spatial layer information, and power ratio information of the first UE, and a precoding matrix indicator (PMI) and spatial layer information of the second UE; and
decode a multiplexed signal intended for both the first UE and the second UE using NOMA wireless communication received at the first UE based on the DCI.

33. The first UE of claim 32, wherein the first UE is an enhancement layer (EL) UE and second UE is a base layer (BL) UE.

34. The first UE of claim 33, wherein the first UE is a Release 14 or later UE and the second UE is a pre-Release 14 UE.

35. The first UE of claim 34, wherein the power ratio information includes a power ratio between an EL only spatial layer and a BL spatial layer.

* * * * *